United States Patent
Altinger et al.

(10) Patent No.: US 10,990,112 B2
(45) Date of Patent: Apr. 27, 2021

(54) METHOD FOR CONTROLLING A DEPLOYMENT OPERATION OF MOTOR VEHICLES IN A PARKING ENVIRONMENT, AND MANAGEMENT SYSTEM FOR A PARKING AREA

(71) Applicant: Audi AG, Ingolstadt (DE)

(72) Inventors: Harald Altinger, Gerolfing (DE); Florian Schuller, Ismaning (DE); Christian Feist, Ingolstadt (DE)

(73) Assignee: Audi AG, Ingolstadt (DE)

( * ) Notice: Subject to any disclaimer, the term of this patent is extended or adjusted under 35 U.S.C. 154(b) by 219 days.

(21) Appl. No.: 16/317,509

(22) PCT Filed: May 23, 2017

(86) PCT No.: PCT/EP2017/062339
§ 371 (c)(1),
(2) Date: Jan. 11, 2019

(87) PCT Pub. No.: WO2018/010879
PCT Pub. Date: Jan. 18, 2018

(65) Prior Publication Data
US 2019/0155308 A1    May 23, 2019

(30) Foreign Application Priority Data
Jul. 15, 2016    (DE) .......................... 102016008747.1

(51) Int. Cl.
*G05D 1/02* (2020.01)
*G06Q 50/30* (2012.01)
(Continued)

(52) U.S. Cl.
CPC ........... *G05D 1/0285* (2013.01); *B60W 30/06* (2013.01); *B62D 15/0285* (2013.01);
(Continued)

(58) Field of Classification Search
CPC .......................... G05D 1/0285; B60W 30/06; B60W 2556/45; B62D 15/0285; G06Q 10/10;
(Continued)

(56) References Cited

U.S. PATENT DOCUMENTS 9,947,223 B2    4/2018    Mielenz
2009/0148259 A1    6/2009    Shani
(Continued)

FOREIGN PATENT DOCUMENTS

CN    102057118 A    5/2011
DE    102008027692 A1    12/2009
(Continued)

OTHER PUBLICATIONS

International Search Report and Written Opinion of the International Search Authority directed to related International Patent Application No. PCT/EP2017/062339, dated Aug. 4, 2017, with attached English-language translation; 24 Sages.
(Continued)

*Primary Examiner* — Gertrude Arthur Jeanglaude
(74) *Attorney, Agent, or Firm* — Sterne, Kessler, Goldstein & Fox P.L.L.C.

(57) ABSTRACT

Method for controlling the deployment operation of motor vehicles in a parking environment, in which, controlled by a management device of the parking environment, motor vehicles can be automatically parked after delivery by the driver and, after detection of a pick-up request on the part of the driver, taken from the parking place to a pick-up position in a pick-up area, wherein authentication information assigned to the motor vehicle, specific to the parking process and optically and/or wirelessly retrievable via a readout connection is provided by the management device to the driver when delivering the motor vehicle, wherein to pick up the motor vehicle, the authentication information is read out
(Continued)

by a readout device in the parking environment, particularly in the pick-up area, and the deployment process is initiated only when the authentication information is present.

20 Claims, 2 Drawing Sheets

(51) Int. Cl.
  *B62D 15/02* (2006.01)
  *G06Q 10/10* (2012.01)
  *B60W 30/06* (2006.01)
  *G06K 19/06* (2006.01)
  *H04B 5/00* (2006.01)

(52) U.S. Cl.
  CPC ............ *G06Q 10/10* (2013.01); *G06Q 50/30* (2013.01); *B60W 2556/45* (2020.02); *G06K 19/06028* (2013.01); *G06K 19/06037* (2013.01); *H04B 5/0056* (2013.01)

(58) Field of Classification Search
  CPC ............ G06Q 50/30; G06K 19/06028; G06K 19/06037; H04B 5/0056
  USPC .......................................................... 701/24
  See application file for complete search history.

(56) References Cited

U.S. PATENT DOCUMENTS

| | | | |
|---|---|---|---|
| 2010/0069035 A1* | 3/2010 | Johnson | H04W 92/18 455/404.1 |
| 2010/0156672 A1 | 6/2010 | Yoo et al. | |
| 2011/0123302 A1 | 5/2011 | Zangerle | |
| 2012/0111937 A1 | 5/2012 | Rogich | |
| 2012/0188100 A1 | 7/2012 | Min et al. | |
| 2013/0231824 A1 | 9/2013 | Wilson et al. | |
| 2014/0294543 A1 | 10/2014 | Järvinen et al. | |
| 2016/0203650 A1 | 7/2016 | Stanford | |

FOREIGN PATENT DOCUMENTS

| | | |
|---|---|---|
| DE | 102013222071 A1 | 4/2015 |
| DE | 102014211557 A1 | 12/2015 |

OTHER PUBLICATIONS

International Preliminary Report on Patentability directed to related International Patent Application No. PCT/EP2017/062339, dated Jan. 15, 2019, with attached English-language translation; 15 pages.

* cited by examiner

METHOD FOR CONTROLLING A DEPLOYMENT OPERATION OF MOTOR VEHICLES IN A PARKING ENVIRONMENT, AND MANAGEMENT SYSTEM FOR A PARKING AREA

TECHNICAL FIELD

This disclosure relates to a method for controlling a deployment operation of motor vehicles in a parking environment, in which, controlled by a management device of the parking environment, motor vehicles can be automatically parked after delivery by the driver and, after detection of a pick-up request on the part of the driver, taken from the parking place to a pick-up position in a pick-up area. This disclosure also relates to a management system for a parking area.

BACKGROUND

Parking environments, e.g., parking lots and/or parking garages having many parking places, in which a driver may park his vehicle, particularly for payment, are already widely known in the prior art. Upon entering the corresponding parking environment, for example, a code card may be received, with which a driver may leave the parking environment again after payment at a pay machine.

Precisely in view of the fact that many motor vehicles, at least within certain system boundaries, have vehicle systems designed to control the motor vehicle fully automatically, recently automated parking environments were suggested, in which a driver parks his motor vehicle in a delivery area, registers it via suitable communication connections, e.g., via a mobile device, with a management system of the parking environment, which then assigns the motor vehicle a parking place and automatically, e.g., by piloting the motor vehicle, brings the motor vehicle to the assigned parking place. If the driver wishes to pick up the motor vehicle again, he may use his mobile device, for example, to communicate a pick-up request to the management system, which controls the motor vehicle to leave its parking position and drive to a pick-up position in a pick-up area. A trajectory to be taken, for example, may be communicated to a vehicle system designed to control the motor vehicle fully automatically. A central processing device of the management system of the parking environment, hereinafter referred to as a management device, may be designed generally to coordinate the operation of the various motor vehicles within the parking environment, particularly also cooperating with the vehicle systems of the motor vehicles themselves.

Such parking systems are known from DE 10 2008 027 692 A1 or DE 10 2014 211 557 A1, for example.

In such driver support by fully automatic parking and leaving the parking space, it is problematic that, because the driver initially has no knowledge of the precise parking position of the motor vehicle and must request this via mobile device or terminal, it cannot be directly ensured that the driver is in the parking environment, particularly the pick-up area, at all. However, this opens the door to improper motor vehicle reclaims, wherein interferences with the flow of traffic may also occur after the motor vehicle is not picked up by the driver in the pick-up area, for example. The physical presence of the driver obviously also could not be determined through a request via the communication connection to the mobile device because cellular and/or Internet connections have a large coverage area.

BRIEF DESCRIPTION OF THE DRAWINGS/FIGURES

The accompanying drawings, which are incorporated herein and form part of the specification, illustrate the present embodiments and, together with the description, further serve to explain the principles of the present embodiments and to enable a person skilled in the relevant art(s) to make and use the present embodiments.

Figure 1:
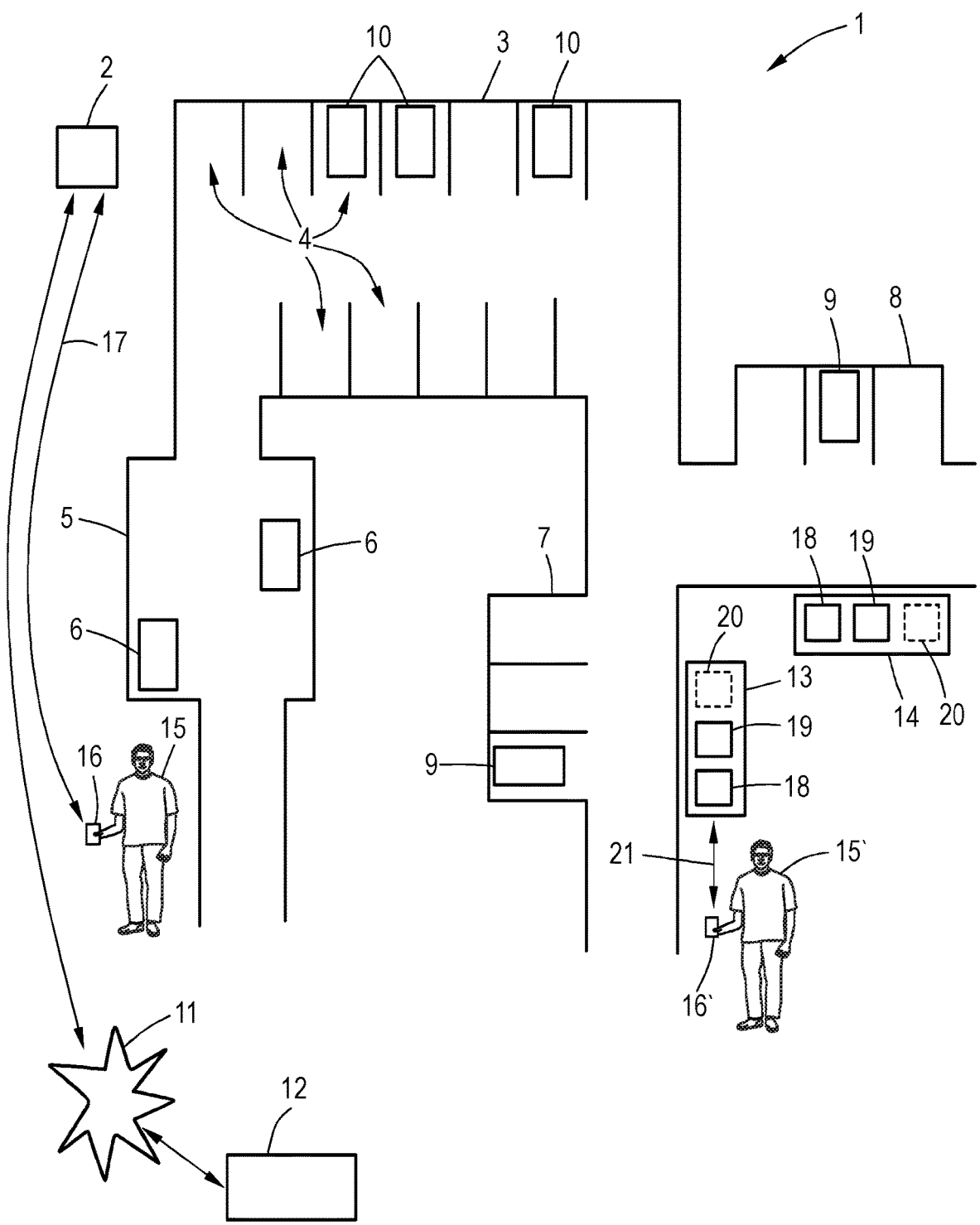
FIG. 1 illustrates a part of a parking environment, as well as devices communicating with a management system of the parking environment, according to some embodiments.

The features and advantages of the present embodiments will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

This disclosure is based on the effect of providing a possibility to determine the presence of the driver in the parking environment, particularly the pick-up area, performed in a simple and reliable manner.

To achieve this effect, during a method like those mentioned earlier, it is provided that authentication information assigned to the motor vehicle, specific to the parking process and optically and/or wirelessly retrievable via a readout connection, is provided by the management device to the driver when delivering the motor vehicle, wherein, to pick up the motor vehicle, the authentication information is read out by a readout device in the parking environment, particularly in the pick-up area, and the deployment process is initiated only when the authentication information is present.

It is furthermore suggested that the authentication to make a pick-up be made available as authentication information, wherein the reclaim of the motor vehicle parked fully automatically takes place through a reading out of the authentication information via a readout device, e.g., a local terminal, in the parking environment. Moreover, the driver initially gives his vehicle to the management of the parking environment using the fully automatic management system, which generates authentication information, which is assigned to this specific motor vehicle and parking process and is generated for the driver. In any case, after a mobile device of the driver has been regularly connected to a corresponding central management device, after successful delivery of the motor vehicle, the authentication information necessary to reclaim the motor vehicle can be transmitted to the mobile device or otherwise provided. When the driver returns, he may have the authentication information read out via the on-site readout device, so the deployment operation may only be initiated when the driver is also actually present in the parking environment, particularly the pick-up area itself. Deployment operation should be understood as the steering process, at the end of which the motor vehicle is in the pick-up position, i.e., deployed. The deployment process can relate to the entire process of leaving the parking position, but also only a final portion of this process, as will be explained in further detail below.

The method according to this disclosure thus ensures that the driver is actually present to receive the motor vehicle, particularly present in the pick-up area.

It is particularly preferred that a communication connection be prepared between a mobile device of the driver, particularly a smartphone, and the management device, wherein the authentication information is transmitted to the mobile device, and/or the readout device reads the authentication information out from the mobile device. After the driver performs the positioning process in the parking environment, e.g., using a general application (app) and/or one specifically designed for the parking environment, the communication connection created for this purpose may also be used with the management device to transmit the generated authentication information from the management device to the mobile device, where it may be correspondingly stored. Upon returning, the driver may once again use his mobile device, particularly his smartphone, e.g., to restart the previously mentioned application, and in case of authentication information to be read out optically, have this displayed, whereupon the mobile device must be moved into the detection area of a corresponding optical sensor, particularly a camera and/or a scanner, so that it is possible to read out the authentication information from the mobile device. If a wireless transfer via a readout connection is provided, this can occur correspondingly. The readout device can then read the authentication information from the mobile device, particularly the smartphone, and can accordingly initiate the deployment process after it is evident that the driver is next to the readout device, thus particularly at least in the parking environment.

To prepare a fallback position, one embodiment of this disclosure suggests that the authentication information, in addition to a particularly vendor-specific Internet portal, to which the driver is logged in, is provided, and the driver retrieves the authentication information again via the Internet portal to the mobile device in case of loss on the mobile device and/or the driver prints out the optically readable authentication information using a printing device of the parking environment particularly adjacent to the readout device and/or integrated into the same. If the authentication information is lost thereby, either because it could not be stored on the mobile device or because the mobile device does not have enough battery power to be used, for example, the authentication information may also be provided in an Internet portal, which the driver may access via a corresponding user account. It thereby becomes possible to download the authentication information again and/or to use a printing device, e.g., a terminal, of the parking environment to print out the authentication information as a hard copy so that it may be read out optically. Of course, it is also imaginable for wireless authentication information read out via a readout connection to be converted into authentication information that may be read out optically if the readout device has corresponding possibilities. The Internet portal may be operated by the motor vehicle manufacturer and/or the parking environment operator. Vendor-specific Internet portals have the advantage that drivers (or generally the persons assigned to the motor vehicle) are often already logged in.

In a specific, preferred embodiment, it may be provided that the authentication information comprises a code, particularly a barcode or a QR (Quick Response) code, which can be displayed on a display device of the mobile device and read out optically by a readout device, and/or at least one part of the authentication information can be read out via a near-field communication interface of the mobile device. Specifically, the authentication information may comprise barcode information and/or NFC (Near-Field Communication) information. This has the advantage that many devices, which are already used today in parking environments, but also many other terminals already have the possibility to read out QR codes and/or NFC information so that such devices may be used as a readout device without special adjustments for authentication to reclaim the motor vehicle. Thus, the disclosed embodiments are particularly easy to implement. The readout device then correspondingly has a barcode reader and/or a QR code reader and/or an NFC device (near-field communication device), via which the readout connection may be prepared.

It should be noted that NFC technology also has further advantages. Thus, in case the authentication information is provided as NFC information, this may be correspondingly read out via an NFC device on the readout device, even if the energy storage unit of the mobile device is dead, e.g., the smartphone battery is dead. A further advantage of NFC technology is its short coverage in the range of a few centimeters, because it may then not result in an "inadvertent" readout of the authentication information, e.g., when passing the readout device, but a targeted, intentional action by the driver is necessary, wherein he moves his mobile device, particularly his smartphone, into the communication area of the readout device to prepare the readout connection and thus particularly in a preferred manner to also order the deployment process, i.e., deployment.

Furthermore, it is advantageous for an application on the mobile phone to be used to communicate with the management device, as previously mentioned, which also generate the authentication information to be read out by the readout device, particularly after the user chooses a deployment function. The application (app) may be set by a corresponding operator action, for example, to show the authentication information, which can be read out optically, on a display of the mobile device, e.g., as a barcode or QR code. In the case of NFC information as authentication information, however, it may already be sufficient to place the mobile device into the coverage area of the NFC device on the readout device.

A particularly advantageous embodiment provides that, after receipt by the management device of a request from the driver's mobile device to leave the parking space, the motor vehicle is initially moved from the parking space in a preparation process of the process taking the car from the parking space to a buffer zone of the parking environment, from which position it is moved to the pick-up position in the pick-up area by initiating the deployment process when authentication information is available within a predetermined waiting period or, if authentication information is not available within the predetermined waiting period, it is parked again. In this way, the driver, to accelerate the whole process, may already request the removal of the car from the parking space without necessarily needing to be in the parking environment. However, to avoid causing traffic and space problems or the possibility of abuse in case of defective requests, the motor vehicle is not driven to the pick-up position immediately after such a request to leave the parking space, but initially brought to a special buffer area provided in the parking environment, where it waits for the readout of the authentication information at the readout device before the actual deployment process is initiated as the second part of the process. If no authentication information is available after the waiting period, which may in particular be between 2 and 15 minutes, e.g., 5 or 10 minutes, the motor vehicle is brought back to the parking position, thus parked. The buffer area is thus advantageously chosen such that a shorter deployment time is achieved for all pick-up areas even if there are multiple pick-up areas.

In an advantageous embodiment, it may be provided that the reading out of the authentication information by the management device is interpreted as an instruction to deploy the motor vehicle assigned to the authentication information. This simply means that the authentication information is read out by the readout device, which, as shown, ideally demands a targeted action of the driver, which may, to receive the greatest possible comfort of use, implicitly reproduce the pick-up request by the driver, and because the authentication information is specific to the motor vehicle, it may also be deduced from the authentication information which motor vehicle is requested, whose driver is now verifiably in the pick-up area or at least the parking environment. The process to remove the motor vehicle from the parking space or generally the deployment process may then immediately begin. In other words, to initiate the deployment process, in particular the entire process of removing the car from the parking space, the reading out of the authentication information may not only be necessary, but also sufficient.

A further, generally advantageous embodiment of the method disclosed herein provides that, in a parking environment with multiple pick-up areas, a readout device is assigned to each pick-up area, wherein the pick-up position of a motor vehicle, in case of a pick-up request, is chosen in the pick-up area assigned to the readout device reading out the authentication information assigned to the motor vehicle. If the parking environment also has multiple pick-up areas, each of which is assigned a readout device, a further benefit may be derived from the fact that authentication information is read out, namely that it is then also known in which pick-up area the driver would like to pick up the motor vehicle so that a pick-up position for the motor vehicle may correspondingly be defined in the pick-up area to which is assigned the corresponding readout device.

It may furthermore be provided that for a parking environment with multiple pick-up areas, it is verified whether user profile information of the driver is present, particularly on the Internet portal or the management device, which displays a preferred pick-up area, wherein, in case of available user profile information, the motor vehicle is deployed in the pick-up area displayed by the user profile information. The user profile information may be generated by the driver, e.g., via an app on the mobile device, and/or statistically identified according to used pick-up areas. In addition to the user profile information describing the pick-up area, or alternatively to this, other user profile information may also be used, which describe other parameters for the deployment process/retrieval process and/or other conditions/services desired by the driver, e.g., the additional use of a wash service and the like.

In addition to the method, this disclosure also relates to a management system for a parking environment, in which, controlled by a management device of the parking environment, motor vehicles can be automatically parked after delivery by the driver and, after detection of a pick-up request on the part of the driver, taken from the parking place to a pick-up position in a pick-up area, having a management device and a readout device and designed to carry out the method disclosed herein. The management device, which preferably comprises or may be a central processing unit, may also be called a central coordination unit, which controls the automatic parking and retrieval processes. By generating the authentication information for the programmed motor vehicles and the subsequent reading out of the authentication information, the management device reliably receives the information that the driver is in the parking environment or preferably in the pick-up area and the retrieval process or at least the deployment process for the motor vehicle to which the authentication information is assigned may meaningfully be initiated. All embodiments of the method disclosed herein may be analogously transferred to the management system, which may have the previously mentioned advantages.

Further advantages and details of this disclosure result from the exemplary embodiments described below as well as from the drawings.

FIG. 1 shows a part of a parking environment as well as devices communicating with the management system of the parking environment, according to some embodiments.

Figure 2:
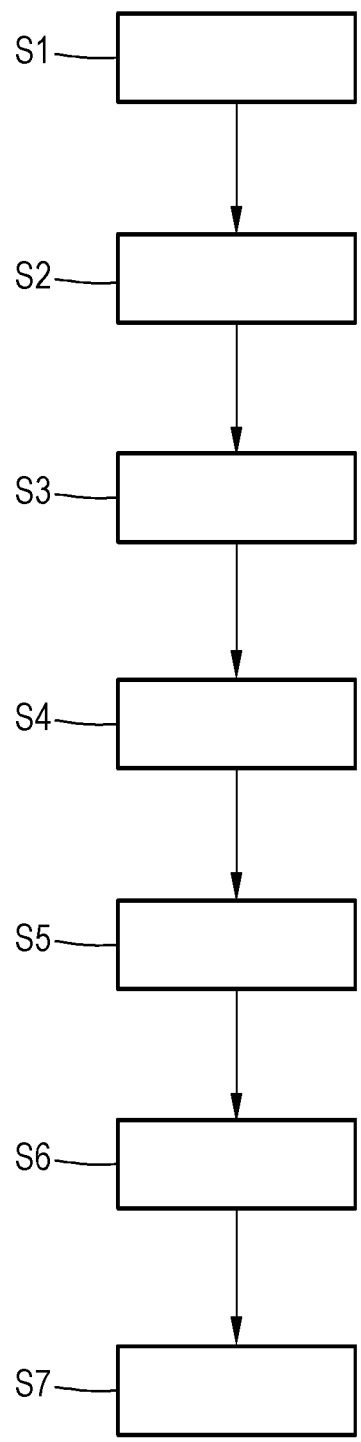
FIG. 2 illustrates a flow chart of an exemplary embodiment of a method for controlling the deployment operation of motor vehicles in the parking environment.

FIG. 2 shows a flow chart of an exemplary embodiment of the method disclosed herein.

FIG. 1 shows a schematic diagram of a parking environment 1, which may be designed as a parking garage and/or a parking lot having multiple parking places. After motor vehicles are automatically parked and removed from parking places in this parking environment through their appropriate steering using a management device 2, the parking environment 1 has, in addition to a parking area 3 with multiple parking spaces 4, of which only a few are shown here as an example, a transfer area 5, in which motor vehicles 6 to be parked may be delivered, and in the present case two pick-up areas 7, 8, at which retrieved motor vehicles 9 are deployed to pick-up positions after the fully automated retrieval process. While other possibilities also exist to bring motor vehicles 6 to a parking space 4, thus to a parking position, in a fully automatic manner, in the present case, it should be assumed that the motor vehicles 6, retrieved motor vehicles 9, or the parked motor vehicles 10 currently parked in parking spaces 4 each have a driver system configured to drive the corresponding motor vehicle in a fully automatic way, to which the management device 2 as a central processing unit, which can also communicate with the motor vehicles 6, the retrieved motor vehicles 9, and the parked motor vehicles 10, can transmit a trajectory to be taken, for example, and/or at least a map of the parking environment 1 with the corresponding target position.

The management device 2 furthermore has access to the Internet 11 in general and thus also to Internet portal 12, which may be vendor-specific, for example. Moreover, the management device 2 communicates, in the present case, through a cable connection, with readout devices 13, 14, wherein the readout device 13 is assigned to the pick-up area 7 as a terminal and the readout device 14 is assigned to the pick-up area 8 as a terminal.

The functioning of the management system should now be explained in greater detail with regard to FIG. 1 using an exemplary embodiment of the method disclosed herein, the flow chart of which is presented in FIG. 2.

In a step S1, a driver 15 parks his motor vehicle as a motor vehicle 6 to be parked in the transfer area 5 and uses an application provided on a mobile device 16, here a smartphone, to register his motor vehicle officially with the management device 2 as a motor vehicle 6 to be parked, whereby a communication connection 17 is used, which may be designed as a cellular connection and/or Internet connection. In a step S2, the management device 2 initiates not only the necessary steps to park the corresponding motor vehicle of the driver 15, but also generates authentication information, which is specific to the motor vehicle and is transmitted to the mobile device 16 via the communication connection 17. At the same time, the management device 2 also transmits the authentication information to the Internet portal 12, to which the driver 15 is logged in, so that the driver 15 still has access to the authentication information should the mobile device 16 fail. The authentication information comprises barcode information and NFC information in the present case.

In a step S3, the driver continues his activities, while his motor vehicle remains in the parking environment 1 as a parked motor vehicle 10.

At a later point in time, which is accordingly marked in FIG. 1 with prime reference numerals, the driver 15' returns to the parking environment 1, specifically to the pick-up area 7, where he finds the readout device 13 as a terminal. Now in step S4, he has multiple possibilities to actuate the deployment of his motor vehicle as a retrieved motor vehicle 9, that is, a motor vehicle to be picked up.

On the one hand, it is imaginable that he holds his mobile device 16' in the communication area of an NFC device 18 of the readout device 13 to prepare a readout connection 21. The authentication information can be read out by the mobile device 16' via this connection, which is also particularly possible if the mobile device 16' currently has no operational current.

The second possibility is for the driver 15' to choose a function in the previously mentioned application to show the authentication information as a barcode, which may then be read out with a barcode reading device 19 of the readout device 13.

Should the driver 15' no longer have the authentication information on his mobile device 16', if this has an operational current, he can load it to the device again from the Internet portal 12 or use a printing device 20 integrated in this case into the readout device 13 to receive a hard copy of the barcode information of the authentication information, which may then be read out correspondingly by the barcode reading device 19 of the readout device 13.

The readout process by the readout device 13 is symbolized in FIG. 2 by the step S5. The readout authentication information is then transmitted to the management device 2 and evaluated there. This means that the correspondingly assigned parked motor vehicle 10 is identified and, since the reading out of the authentication information is both necessary and sufficient to initiate the retrieval process, the retrieval process is initiated in step S6. After the management device 2 knows at which readout device 13, 14 the authentication information was read out, it is also known to which pick-up area 7, 8 the motor vehicle should be deployed as a retrieved motor vehicle 9 to be picked up, in the present case in pick-up area 7, where the driver 15' is.

In a step S7, the driver 15' then receives his motor vehicle as a retrieved motor vehicle 9 to be picked up at the pick-up position, wherein he authenticates himself to the vehicle, as usual, using his vehicle key, which guarantees him access to the motor vehicle.

In an optional expansion of the described exemplary embodiment, the parking environment 1 may also have a buffer zone not shown here, ideally adjacent to the pick-up areas 7, 8. The driver 15, 15' can then send a retrieval request to the management device 2 via his mobile device 16, 16' before even reaching the parking environment 1, which leads to the motor vehicle as a parked motor vehicle 10 to be retrieved initially being driven to the buffer area, where it waits for a predetermined waiting period, e.g., 5 minutes. If the driver 15' arrives to a readout device 13, 14 during the waiting period and the authentication information is read out as described, the management device 2 initiates a deployment process, in which the retrieval process is concluded and the motor vehicle is driven to the pick-up position in the corresponding pick-up area, here pick-up area 7. Otherwise, the motor vehicle is parked again.

It should also be noted that the pick-up area 7, 8 must not necessarily be chosen for deployment based on the readout device used. It is also imaginable to use user profile information archived in the management device 2 and/or the Internet portal 12, which describes a pick-up area 7, 8. The user profile information may be set by the driver, e.g., via an app on the mobile device 16, 16', and/or statistically identified according to used pick-up area 7, 8.

The invention claimed is:

1. A method for controlling a deployment operation of a motor vehicle in a parking environment, comprising:
   connecting between a management device of the parking environment and a mobile device of a driver of the motor vehicle via a communication connection,
      wherein the communication connection is provided by the management device to the mobile device at a time of delivery of the motor vehicle by the driver to a transfer area of the parking environment;
   generating, by the management device, authentication information specific to the motor vehicle and a parking process;
   transmitting, by the management device to the mobile device of the driver over the communication connection, the authentication information;
   automatically parking, by the management device, the motor vehicle according to the parking process in a parking space of the parking environment;
   detecting, by the management device at a later time, a pick-up request by the driver of the motor vehicle, wherein the pick-up request is transmitted from the mobile device of the driver to a readout device in a pick-up area of the parking environment;
   reading the authentication information, by the readout device, from the mobile device of the driver;
   receiving, by the management device from the readout device, the authentication information;
   identifying, by the management device, the motor vehicle from the authentication information; and
   initiating, by the management device, a retrieval process of the motor vehicle from the parking space of the parking environment, wherein the driver receives the motor vehicle in a pick-up position of the pick-up area of the parking environment as a result of the retrieval process.

2. The method according to claim 1, wherein the mobile device of the driver is a smartphone, and wherein the transmitting by the management device of the authentication information further comprises wirelessly receiving, by the smartphone, the authentication information from the management device.

3. The method according to claim 1, wherein the mobile device of the driver is a smartphone, and wherein the reading of the authentication information by the readout device further comprises optically reading a display of the smartphone.

4. The method according to claim 1, further comprising:
   transmitting, by the management device to an Internet portal, the authentication information, wherein the driver has access to the Internet portal;
   logging in, by the mobile device of the driver, to the Internet portal; and retrieving, by the mobile device of the driver, the authentication information from the Internet portal.

5. The method according to claim 1, further comprising:
printing, from a printing device of the parking environment, an optically readable printout of the authentication information; and
reading, by the readout device, the authentication information from the optically readable printout.

6. The method according to claim 1, wherein the reading of the authentication information by the readout device further comprises optically reading a barcode or a Quick Response (QR) code on a display of the mobile device.

7. The method according to claim 1, further comprising:
reading, via a near-field communication (NFC) interface of the mobile device, at least one part of the authentication information.

8. The method according to claim 1, wherein the controlling the deployment operation of the motor vehicle in the parking environment further comprises using an application on the mobile device, the application responding to user selection of a deployment function by preparing the authentication information to be read out from the mobile device by the readout device.

9. The method according to claim 1, further comprising:
after the detecting, by the management device, of the pick-up request by the driver of the motor vehicle, initiating a preparation process of the retrieval process, wherein the motor vehicle is moved from the parking space to a buffer zone of the parking environment;
checking, by the management device, for availability of the authentication information within a predetermined waiting period; and
upon confirming the availability of the authentication information within the predetermined waiting period, initiating, by the management device, the deployment process, wherein the motor vehicle is moved to the pick-up position in the pick-up area.

10. The method according to claim 1, wherein the receiving of the authentication information by the management device from the readout device comprises interpreting an instruction to deploy the motor vehicle specified by the authentication information.

11. The method according to claim 1, further comprising:
in a parking environment having multiple pick-up areas, assigning a corresponding pick-up position in a corresponding pick-up area of the multiple pick-up areas to the motor vehicle based on the authentication information specific to the motor vehicle read by a corresponding readout device of the corresponding pick-up area.

12. The method according to claim 11, further comprising:
reading user profile information of the driver from an Internet portal or the management device, the user profile information displaying a preferred pick-up area of the multiple pick-up areas, wherein the driver receives the motor vehicle in the corresponding pick-up position of the preferred pick-up area of the parking environment as the result of the retrieval process.

13. A management system for a parking environment, comprising:
a management device having at least one processor; and
at least one readout device,
wherein the at least one processor is configured to:
connect the management device of the parking environment to a mobile device of a driver of a motor vehicle via a communication connection,
wherein the communication connection is provided by the management device to the mobile device at a time of delivery of the motor vehicle by the driver to a transfer area of the parking environment;
generate authentication information specific to the motor vehicle and a parking process;
transmit, to the mobile device of the driver over the communication connection, the authentication information;
perform operations to automatically park the motor vehicle according to the parking process in a parking space of the parking environment;
detect, at a later time, a pick-up request by the driver of the motor vehicle,
wherein the pick-up request is transmitted from the mobile device of the driver to one of the at least one readout device in a pick-up area of the parking environment, and
wherein the one of the at least one readout device is configured to read the authentication information from the mobile device of the driver;
receive, from the one of the at least one readout device, the authentication information;
identify the motor vehicle from the authentication information; and
initiate a retrieval process of the motor vehicle from the parking space of the parking environment, wherein the driver receives the motor vehicle in a pick-up position of the pick-up area of the parking environment as a result of the retrieval process.

14. The management system according to claim 13, wherein the mobile device of the driver is a smartphone, and wherein the at least one processor of the management device is further configured to transmit the authentication information wirelessly to the smartphone.

15. The management system according to claim 13, wherein the mobile device of the driver is a smartphone, and wherein the one of the at least one readout device is further configured to optically read a display of the smartphone.

16. The management system according to claim 13, wherein the at least one processor of the management device is further configured to:
transmit, to an Internet portal, the authentication information, wherein the driver has access to the Internet portal; and
provide access to the mobile device of the driver to the authentication information via the Internet portal, wherein the mobile device of the driver is configured to:
log in to the Internet portal; and
retrieve the authentication information from the Internet portal.

17. The management system according to claim 13, further comprising:
a printing device, configured to print an optically readable printout of the authentication information, wherein the one of the at least one readout device is configured to read the authentication information from the optically readable printout.

18. The management system according to claim 13, wherein to read the authentication information, the one of the at least one readout device is further configured to optically read a barcode or a Quick Response (QR) code on a display of the mobile device.

19. The management system according to claim 13, wherein the mobile device includes an application configured to respond to user selection of a deployment function by preparing the authentication information to be read out from the mobile device by the one of the at least one readout device.

20. The management system according to claim 13, wherein the at least one processor of the management device is further configured to:
- after the detecting of the pick-up request by the driver of the motor vehicle, initiate a preparation process of the retrieval process, wherein the motor vehicle is moved from the parking space to a buffer zone of the parking environment;
- check for availability of the authentication information within a predetermined waiting period; and
- upon confirming the availability of the authentication information within the predetermined waiting period, initiate the deployment process, wherein the motor vehicle is moved to the pick-up position in the pick-up area.

* * * * *